(12) United States Patent
Sawhney

(10) Patent No.: US 8,909,298 B2
(45) Date of Patent: Dec. 9, 2014

(54) APPARATUS AND METHOD FOR MOBILE SCREEN NAVIGATION

(75) Inventor: Parvinder Sawhney, Fremont, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 380 days.

(21) Appl. No.: 13/250,066

(22) Filed: Sep. 30, 2011

(65) Prior Publication Data

US 2013/0084920 A1    Apr. 4, 2013

(51) Int. Cl.
*H04W 88/02* (2009.01)
*G06F 3/0481* (2013.01)
*G06F 3/0488* (2013.01)
*G06F 3/0483* (2013.01)

(52) U.S. Cl.
CPC .......... *G06F 3/04883* (2013.01); *G06F 3/0481* (2013.01); *G06F 3/0483* (2013.01)
USPC ......................................................... 455/566

(58) Field of Classification Search
USPC ........................................... 455/566; 715/838
See application file for complete search history.

(56) References Cited

U.S. PATENT DOCUMENTS

2010/0085303 A1*  4/2010  Kwok et al. ................... 345/157
2010/0095240 A1*  4/2010  Shiplacoff et al. ............ 715/784
2012/0071208 A1*  3/2012  Lee et al. ...................... 455/566

* cited by examiner

*Primary Examiner* — Diane Mizrahi
(74) *Attorney, Agent, or Firm* — Jefferson IP Law, LLP

(57) ABSTRACT

An apparatus and method for displaying screens on a mobile terminal are provided. The mobile terminal includes a display unit for displaying one of a plurality of screens, the screens arranged as a grid having at least two columns and at least two rows, an input unit for receiving a movement command from a user, and a controller for controlling the display unit to display a next screen based on a currently displayed screen and the movement command.

14 Claims, 5 Drawing Sheets

APPARATUS AND METHOD FOR MOBILE SCREEN NAVIGATION

BACKGROUND OF THE INVENTION

1. Field of the Invention

The present invention relates to an apparatus and method for mobile screen navigation. More particularly, the present invention relates to an apparatus and method for navigating between screens displayed on a mobile terminal.

2. Description of the Related Art

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Mobile terminals typically provide a user interface having a home screen. The home screen displays icons corresponding to applications and other features offered by the mobile terminal, such as a telephone function. The home screen may also display other information to the user, such as battery strength, signal strength, alert messages, currently playing music, and the like. As the user obtains more applications, or wishes to display more information on the home screen, the home screen may become more cluttered, and space may become limited. To address this issue, mobile terminals often provide a plurality of home screens.

FIG. 1 shows an arrangement of a plurality of home screens in a mobile terminal according to the related art.

Referring to FIG. 1, a plurality of home screens 110, 120, 130, and 140 are arranged linearly. To move from one home screen to another, the user inputs a movement signal to the right or the left, either via an input key or via a gesture on a touchpad of the mobile terminal. To move from screen 120 to screen 140, the user inputs a left-movement signal twice, such as by making two swipe motions on the screen in rapid succession.

The mobile terminal may support a wrap-around function, such that the user may move from screen 140 to screen 110 by inputting a rightward direction signal (e.g., by swiping to the right on screen 140). Alternatively, the mobile terminal may display a default screen, such as a search function, when the user attempts to move beyond the last home screen. For example, when the user swipes to the left while screen 110 is displayed, the mobile terminal may display a search screen.

However, while the linear arrangement of FIG. 1 is acceptable for a relatively small number of home screens, such as two or three, the liner arrangement becomes increasingly cumbersome. In the linear arrangement, each screen enables access to only two other screens. For example, the screen 140 can only be reached from the screen 130 (and, if the mobile terminal supports wrap-around, the screen 110). If the mobile terminal is displaying screen 120 and the user wishes to move to screen 140, the user must first move to screen 130 and then move to screen 140. Even if the mobile terminal supports a wrap-around function, the user would still have to move to screen 110 and then to screen 140. As the number of home screen increases, the number of movement commands required to move from one screen to another increases at a similar rate.

Accordingly, there is a need for a user interface permitting a user to more from one home screen to another quickly, even when a large number of home screens are provided.

SUMMARY OF THE INVENTION

Aspects of the present invention are to address at least the above-mentioned problems and/or disadvantages and to provide at least the advantages described below. Accordingly, an aspect of the present invention is to provide an apparatus and method for home screen navigation.

In accordance with an aspect of the present invention, a mobile terminal is provided. The mobile terminal includes a display unit for displaying one of a plurality of screens, the screens arranged as a grid having at least two columns and at least two rows, an input unit for receiving a movement command from a user, and a controller for controlling the display unit to display a next screen based on a currently displayed screen and the movement command.

In accordance with another aspect of the present invention, a method of displaying one of a plurality of screens is provided. The method includes displaying one of the plurality of screens, the plurality of screens arranged in a grid pattern having at least two columns and at least two rows, receiving a movement command from a user to display another of the plurality of screens, and displaying a next screen based on the previously displayed screen and the movement command.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 2:
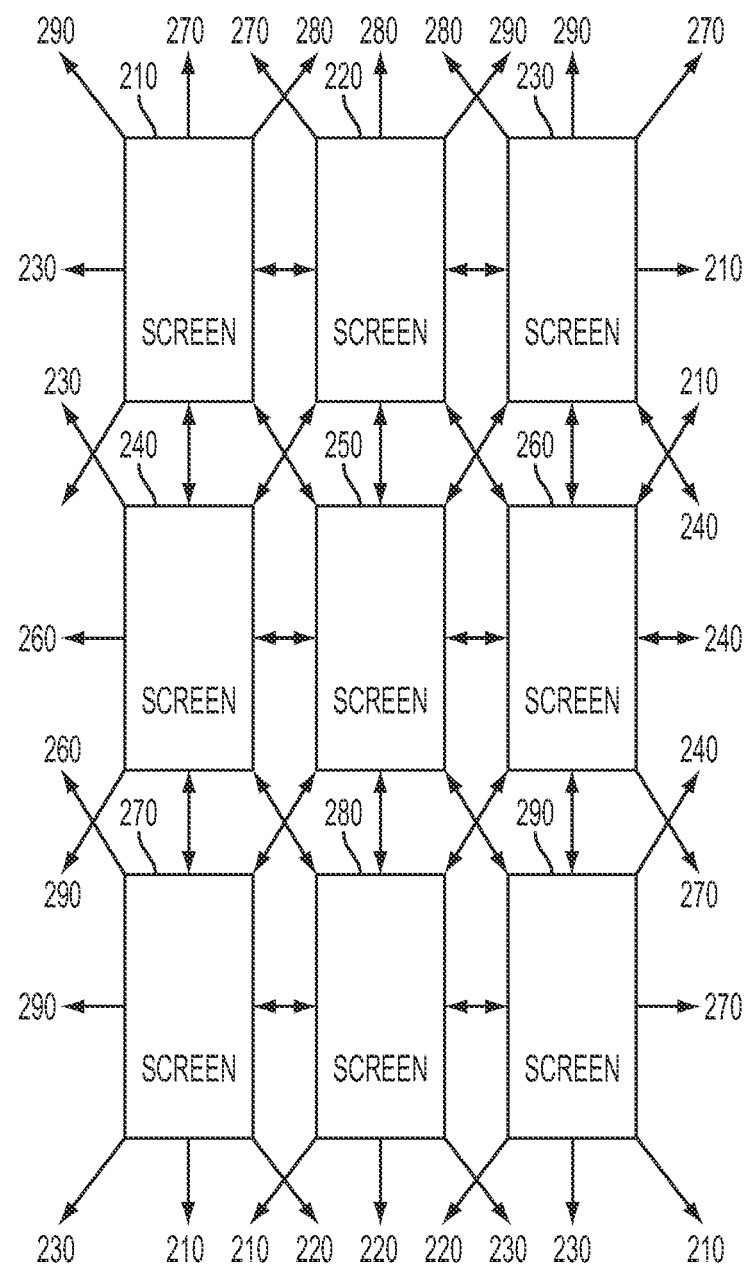
FIG. 2 illustrates an arrangement of a plurality of home screens according to exemplary embodiments of the present invention.
Figure 3:
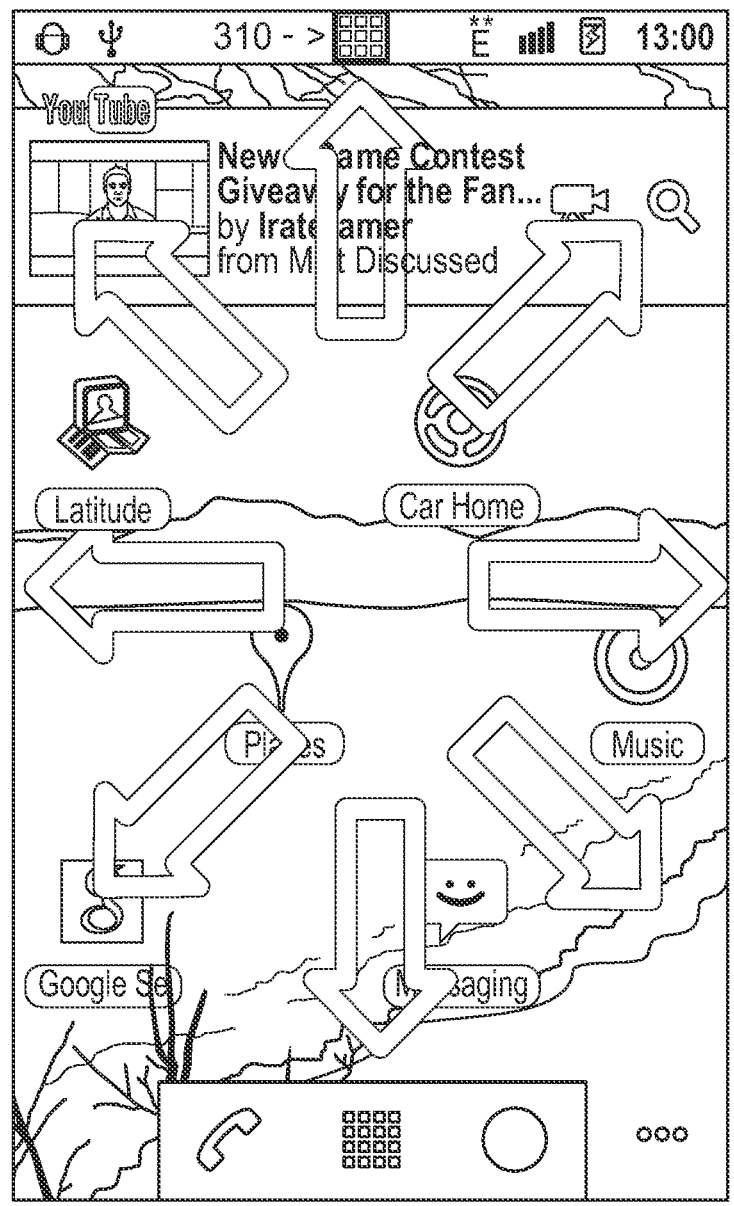
FIG. 3 illustrates a home screen according to an exemplary embodiment of the present invention.

Exemplary embodiments of the present invention include an apparatus and method for providing a plurality of home screens in a mobile terminal FIG. 2 illustrates an arrangement of a plurality of home screens according to exemplary embodiments of the present invention, and FIG. 3 illustrates a home screen according to an exemplary embodiment of the present invention.

Figure 1:
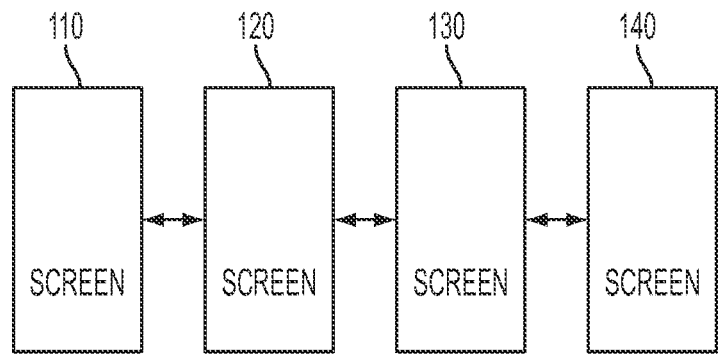
FIG. 1 illustrates an arrangement of a plurality of home screens in a mobile terminal according to the related art.

Referring to FIGS. 2 and 3, a plurality of home screens are arranged in a grid pattern, instead of in a line pattern according to the related art shown in FIG. 1. In FIG. 2, the home screens are arranged in a 3×3 grid, for a total of 9 screens. However, this is merely exemplary; other grid arrangements may also be employed, including 2×2 or 2×3.

The user may input a movement command to move in any of eight directions, as shown in FIG. 2. In addition to the east/west movement described above with respect to FIG. 1, the user may also input a movement command to move to the northwest, north, northeast, southeast, south, and southwest. In a 3×3 grid or smaller, this allows the user to move from one screen to any other screen in just one movement. In order to ensure that every screen is reachable in one movement from any other screen, the display supports a wrap-around feature, as shown in FIG. 3.

Even in grid sizes greater than 3×3, the number of movements to get to a screen from any other screen is much reduced compared to the linear arrangement of FIG. 1. For example, in a 4×4 grid, up to two movement commands may be needed to move from one screen to another screen in the grid, but the number of screens provided increases to sixteen. Using a grid arrangement enables the number of screens provided to increase polynomially while only increasing the number of movement commands required linearly.

In the four-screen arrangement of FIG. 1, the user still needs to input two movement commands to move from screen 120 to screen 140. By contrast, the arrangement illustrated in FIG. 2 allows the user to move from any of nine screens to any other screen. For example, to move from screen 240 to screen 290, the user only needs to input a southwest movement signal (e.g., swipe the screen in a southwesterly direction). If the nine screens of FIG. 2 were arranged linearly as in FIG. 1, the user would need to input at least six movement commands, moving from screen 240 to screen 250 and so on to reach screen 290.

Figure 4:
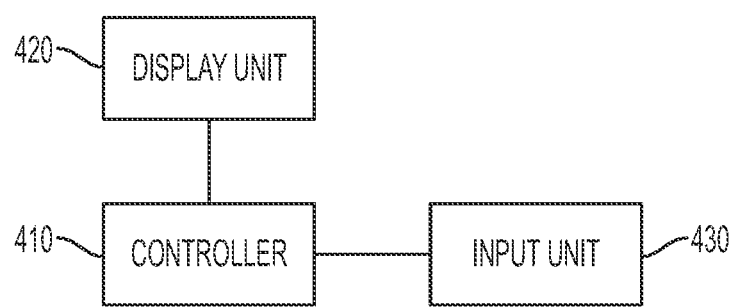
FIG. 4 is a diagram of a mobile terminal according to an exemplary embodiment of the present invention.

FIG. 4 illustrates a mobile terminal according to an exemplary embodiment of the present invention.

Referring to FIG. 4, the mobile terminal includes a controller 410, a display unit 420, and an input unit 430. The mobile terminal may also include additional units not shown here for purposes of clarity.

The display unit 420 displays one of a plurality of home screens, which are arranged in a grid pattern such as the pattern shown in FIG. 3. The display unit may also display an icon 310 indicating the particular home screen currently being displayed and its location within the grid, as shown in FIG. 3. Such an icon enables the user to determine which screen is being displayed, as well as the input needed to switch to another home screen. The icon may be located in a status bar, which may be displayed across the top or bottom of the screen.

The display unit 420 may be provided as a Liquid Crystal Display (LCD). In this case, the display unit 420 may include a controller for controlling the LCD, a video memory in which image data is stored and a display panel having an LCD element. The display unit 420 may also include a touch panel, which receives the user's touch gestures made on the display panel.

The input unit receives input from the user, and may include one or more keys. The input unit may include directional keys, a numeric keypad, and the like. If the display unit 420 is equipped with a touch screen, all or some of the functionality of the input unit 430 may be integrated with the display unit 420.

The controller 410 controls the overall operations of the mobile terminal 400. When the user inputs a movement command to move from one home screen to another, the controller determines the particular direction of movement (e.g., east, northeast, south, etc.), and controls the display unit to display the corresponding home screen. The corresponding home screen will depend on the currently displayed home screen and the direction of movement indicated by the user. For example, if the display unit 410 is currently displaying screen 250 and the user inputs a west movement command, the controller 410 controls the display unit to display the corresponding screen 240.

The controller 410 employs a wrap-around function to reduce the number of movement commands required to move from screen to screen. When the user inputs a movement command to move "off the grid", such as a northwest movement command from screen 210 in FIG. 2, the controller controls the display unit to display a corresponding screen on the other side of the grid. In the case of a northwest movement command from screen 210, the controller controls the display unit to display screen 290, as shown in FIG. 2. Similarly, if the display unit 420 is currently displaying the screen 220 and the user inputs a north movement command, the controller 410 controls the display unit to display the screen 280.

The user may input the movement command in one of several ways. If the mobile device is equipped with a touch panel, the user may input the movement command via a touch gesture on the touch panel. The touch gesture may be a swipe movement, in which the user swiftly moves a finger or stylus across the touch panel in a given direction. The controller 410 interprets the movement across the touch panel as a swipe, and controls the display unit 420 to display a corresponding screen.

If the mobile device does not include a touch panel, the user may input the movement command via the input unit 430. The input unit 430 may include a direction pad or a numeric keypad for this purpose. When the user presses a certain button, or pushes the direction pad in a particular direction, the controller 410 controls the display unit 420 to display the corresponding home screen. If the input unit 430 includes a mouse, the user may input the movement direction by dragging the mouse in a corresponding direction.

Figure 5:
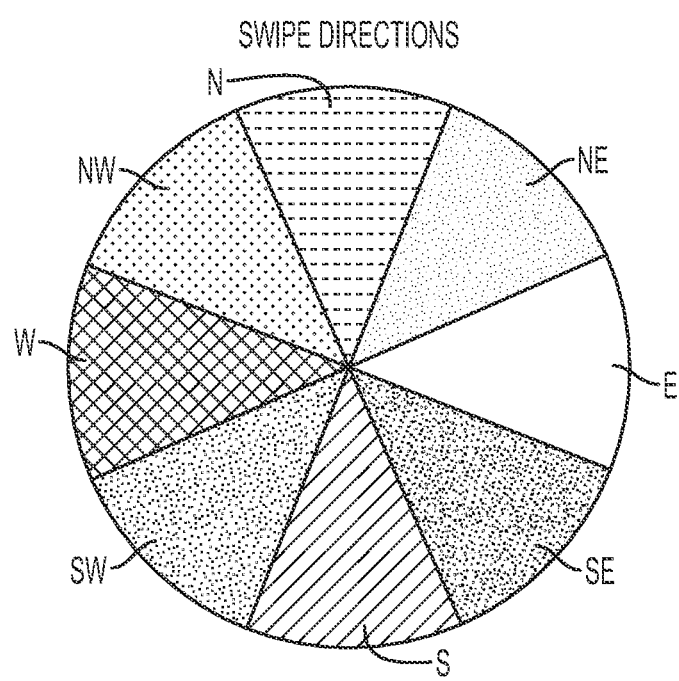
FIG. 5 is a diagram showing swipe directions for moving from one home screen to another according to an exemplary embodiment of the present invention.

FIG. 5 is a diagram showing swipe directions for moving from one home screen to another according to an exemplary embodiment of the present invention.

Referring to FIG. 5, the controller 410 determines which direction the user swipes based on the angle of the particular swipe. With eight possible directions to move, each direction is assigned an arc of about 45 degrees. If the user makes a movement direction having an angle within the range assigned to a particular direction, the controller 410 interprets the swipe as a movement command in the corresponding direction.

For example, a horizontal movement to the right (i.e., east) may be assigned the 0 degree value. The arc assigned to each movement direction may be centered around the corresponding cardinal direction. Thus, the controller 410 may interpret a swipe having an angle between 337.5 degrees and 22.5 degrees as an east movement command. Similarly, a swipe having an angle between 22.5 degrees and 67.5 degrees is interpreted as a northeast movement command, and so on. If the home screen 260 is currently being displayed and the user makes a swipe at an angle of 170 degrees, the controller 410 determines that the user has made a west movement command, as 170 degrees lies within the range corresponding to west movement commands (i.e., 175.5°-202.5°). The controller 410 then controls the display unit 420 to display the screen 250, which is to the west of the screen 260 as seen in FIG. 2.

Arranging the home screens in a grid according to exemplary embodiments of the present invention enables the user to move between a large number of screens using only one movement command. In contrast, a nine-screen linear arrangement could require the user to input as many as eight movement commands to move from one screen to another screen. As a result, the user may employ many more home screens and further customize the mobile terminal without requiring a lengthy process to move from one screen to another.

While exemplary embodiments of the present invention have been described with respect to home screens, exemplary embodiments of the present invention may also be applied to other screens, such as screens presented by applications. For example, if an application uses a large number of screens, the screens may be arranged in the grid pattern shown in FIG. 3 so as to reduce the number of movement commands required to access the various screens. Similarly, the grid arrangement may be used instead of a menu. Instead of inputting a menu command, selecting an item from the menu, and then moving to a corresponding screen, the user may simply input a movement command in a direction corresponding to the menu item. The controller 410 may then control the display unit to display a screen corresponding to the menu item.

The mobile terminal according to exemplary embodiments of the present invention may include a smartphone, a tablet, a Personal Digital Assistant (PDA), a portable media player, a music player, and the like. Similarly, exemplary embodiments of the present invention may be applied to other computing devices, such as a kiosk, portable computer, or desktop computer.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile terminal, comprising:
    a display unit for displaying one of a plurality of screens, the screens arranged as a grid having at least two columns and at least two rows;
    an input unit comprising a touch panel incorporated with the display unit, for receiving a movement command from a user; and
    a controller for controlling the display unit to display a next screen of the plurality of screens that is not currently displayed, based on a currently displayed screen of the plurality of screens and the movement command,
    wherein the movement command is a gesture by the user in one of at least five different directions.

2. The mobile terminal of claim 1, wherein the plurality of screens comprise nine screens arranged in a grid having three rows and three columns.

3. The mobile terminal of claim 1, wherein the movement command is a swipe gesture across the touch panel.

4. The mobile terminal of claim 1, wherein the plurality of screens are a plurality of home screens of the mobile device.

5. The mobile terminal of claim 1, wherein the plurality of screens are a plurality of screens of an application executing on the mobile device.

6. The mobile terminal of claim 5, wherein each of the plurality of screens corresponds to a particular menu item of the application.

7. The mobile terminal of claim 1, wherein, for each of the plurality of screens, the display unit displays an icon indicating a location of the screen within the grid.

8. The mobile terminal of claim 1, wherein the controller arranges the grid such that each of the plurality of screens may be reached from any of the other screens by inputting only one command.

9. A method of displaying one of a plurality of screens, the method comprising:
    displaying one of the plurality of screens on a touch screen display, the plurality of screens arranged in a grid pattern having at least two columns and at least two rows;
    receiving a movement command from a user to display another of the plurality of screens; and
    displaying a next screen of the plurality of screens that is not currently displayed, based on the previously displayed screen of the plurality of screens and the movement command,
    wherein the movement command is a gesture by the user in one of at least five different directions.

10. The method of claim 9, wherein the plurality of screens comprise nine screens arranged in a grid having three rows and three columns.

11. The method of claim 9, wherein the plurality of screens are a plurality of home screens of a mobile device.

12. The method of claim 9, wherein the plurality of screens are a plurality of screens of an application.

13. The method of claim 9, wherein, for each of the plurality of screens, the display unit displays an icon indicating a location of the screen within the grid.

14. The method of claim 9, wherein the grid is arranged such that each of the plurality of screens may be reached from any of the other screens by inputting only one command.

* * * * *